(12) United States Patent
Seltzer et al.

(10) Patent No.: US 7,516,067 B2
(45) Date of Patent: Apr. 7, 2009

(54) METHOD AND APPARATUS USING HARMONIC-MODEL-BASED FRONT END FOR ROBUST SPEECH RECOGNITION

(75) Inventors: Michael Seltzer, Pittsburgh, PA (US); James Droppo, Duvall, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 821 days.

(21) Appl. No.: 10/647,586

(22) Filed: Aug. 25, 2003

(65) Prior Publication Data

US 2005/0049857 A1    Mar. 3, 2005

(51) Int. Cl.
G10L 21/02    (2006.01)
G10L 15/00    (2006.01)
G10L 15/20    (2006.01)

(52) U.S. Cl. .................. 704/226; 704/227; 704/228; 704/231; 704/233

(58) Field of Classification Search ................ 704/226, 704/228, 227, 233, 231
See application file for complete search history.

(56) References Cited

U.S. PATENT DOCUMENTS

| | | | | |
|---|---|---|---|---|
| 5,701,390 | A | 12/1997 | Griffin et al. | 395/2.15 |
| 5,812,970 | A * | 9/1998 | Chan et al. | 704/226 |
| 6,029,128 | A | 2/2000 | Jarvinen et al. | 704/220 |
| 6,449,594 | B1 * | 9/2002 | Hwang et al. | 704/233 |
| 6,453,285 | B1 * | 9/2002 | Anderson et al. | 704/210 |
| 7,110,944 | B2 * | 9/2006 | Balan et al. | 704/226 |
| 7,120,580 | B2 * | 10/2006 | Rao Gadde et al. | 704/233 |
| 7,447,630 | B2 * | 11/2008 | Liu et al. | 704/228 |
| 7,464,029 | B2 * | 12/2008 | Visser et al. | 704/210 |
| 2001/0018655 | A1 * | 8/2001 | Yeldener | 704/258 |
| 2002/0035470 | A1 * | 3/2002 | Gao | 704/226 |
| 2002/0039425 | A1 * | 4/2002 | Burnett et al. | 381/94.7 |
| 2003/0220786 | A1 * | 11/2003 | Chandran et al. | 704/205 |
| 2008/0167863 | A1 * | 7/2008 | Choi et al. | 704/208 |

FOREIGN PATENT DOCUMENTS

EP    0 899 718 A2    3/1999

OTHER PUBLICATIONS

Yumoto, Eiji. "Harmonics-to-noise ratio as an index of the degree of hoarseness," Journal of Acoutical Society of America, pp. 1544-1550, 1982.*
Seltzer, Michael. "SPHINXIII Signal Processing front End Specification", CMU Speech Group. Aug. 31, 1999.*
Seltzer, Michael. "Automatic Detection of Corrupt Spectrographic Features For Robust Speecfh Recognition", Master of Science Thesis, Department of Science in Electrical and Computer Engineering, Carnegie Mellon University. May 2000.*

(Continued)

*Primary Examiner*—Patrick N Edouard
*Assistant Examiner*—Paras Shah
(74) *Attorney, Agent, or Firm*—Theodore M. Magee; Westman, Champlin & Kelly, P.A.

(57) ABSTRACT

A system and method are provided that reduce noise in speech signals. The system and method decompose a noisy speech signal into a harmonic component and a residual component. The harmonic component and residual component are then combined as a sum to form a noise-reduced value. In some embodiments, the sum is a weighted sum where the harmonic component is multiplied by a scaling factor. In some embodiments, the noise-reduced value is used in speech recognition.

18 Claims, 5 Drawing Sheets

OTHER PUBLICATIONS

Chazan, D.; Hoory, R.; Cohen, G.; Zibulski, M., "Speech reconstruction from mel frequency cepstral coefficients and pitch frequency," Acoustics, Speech, and Signal Processing, 2000. ICASSP '00. Proceedings. 2000 IEEE International Conference on , vol. 3, no.pp. 1299-1302 vol. 3, 2000.*

Stylianou, Y., "Applying the harmonic plus noise model in concatenative speech synthesis," Speech and Audio Processing, IEEE Transactions on , vol. 9, No. 1pp. 21-29, Jan. 2001.*

A. Eronen, "Automatic Musical Instrument Recognition", Master of Science Thesis, Department of Information Technology, Tampere University of Technology, 2001. http://citeseer.ist.psu.edu/eronen01automatic.html.*

Virtanen, T.; Klapuri, A., "Separation of harmonic sounds using linear models for the overtone series," Acoustics, Speech, and Signal Processing, 2002. Proceedings. (ICASSP '02). IEEE International Conference on , vol. 2, no.pp. 1757-1760, 2002.*

Rezayee, A.; Gazor, S., "An adaptive KLT approach for speech enhancement," Speech and Audio Processing, IEEE Transactions on , vol. 9, No. 2, pp. 87-95, Feb. 2001.*

Gu, L., et al., "Perceptual Harmonic Cepstral Coefficients for Speech Recognition in Noisy Environment," Proceedings of ICASSP, Salt Lake City, Utah, May 2001.

Ealey, D., et al., "Harmonic Tunnelling: Tracking Non-Stationary Noises During Speech," Proceedings of Eurospeech, Aalborg, Denmark, Sep. 2001.

Yegnanarayana, B., et al., "An Iterative Algorithm for Decomposition of Speech Signals into Periodic and Aperiodic Components," IEEE Transactions on Speech and Audio Processing, vol. 6, No. 1, pp. 1-11, Jan. 1998.

Laroche, J., et al., "HNM: A Simple Efficient Harmonic + Noise Model for Speech," Proceedings of IEEE Workshop on Applications of Signal Processing to Audio and Acoustic, Mohonk, NY, Oct. 1993.

Tabrikian, J., et al., "Speech Enhancement by Harmonic Modeling Via Map Pitch Tracking," Proceeding ICASSP 2002, vol. 1, pp. 1549-1552.

European Search Report for corresponding European Application EP 04103533.

First Official Communication for corresponding European Application EP 4103533.8, filed Jul. 23, 2004.

European Search Report for corresponding European Application EP 04103533, Feb. 25, 2005.

* cited by examiner

METHOD AND APPARATUS USING HARMONIC-MODEL-BASED FRONT END FOR ROBUST SPEECH RECOGNITION

BACKGROUND OF THE INVENTION

The present invention relates to noise reduction. In particular, the present invention relates to removing noise from signals used in speech recognition.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

To decode the incoming test signal, most recognition systems utilize one or more models that describe the likelihood that a portion of the test signal represents a particular pattern. Examples of such models include Neural Nets, Dynamic Time Warping, segment models, and Hidden Markov Models.

Before a model can be used to decode an incoming signal, it must be trained. This is typically done by measuring input training signals generated from a known training pattern. For example, in speech recognition, a collection of speech signals is generated by speakers reading from a known text. These speech signals are then used to train the models.

In order for the models to work optimally, the signals used to train the models should be similar to the eventual test signals that are decoded. In particular, the training signals should have the same amount and type of noise as the test signals that are decoded.

Typically, the training signal is collected under "clean" conditions and is considered to be relatively noise free. To achieve this same low level of noise in the test signal, many prior art systems apply noise reduction techniques to the testing data.

One technique for removing noise attempts to model the noise using a set of training signals collected under various noisy conditions. However, such systems are only effective if the noise conditions of the training signals match the noise conditions of the test signals. Because of the large number of possible noises and the seemingly infinite combinations of noises, it is very difficult to build noise models that can handle every test condition.

Another technique for removing noise is to estimate the noise and then subtract it from the noisy speech signal. Typically, such systems estimate the noise from a previous frame of the input signal. As such, if the noise is changing over time, the estimate of the noise for the current frame will be inaccurate.

One system of the prior art for estimating the noise in a speech signal uses the harmonics of human speech. The harmonics of human speech produce peaks in the frequency spectrum. By identifying nulls between these peaks, these systems identify the spectrum of the noise. This spectrum is then subtracted from the spectrum of the noisy speech signal to provide a clean speech signal.

The harmonics of speech have also been used in speech coding to reduce the amount of data that must be sent when encoding speech for transmission across a digital communication path. Such systems attempt to separate the speech signal into a harmonic component and a random component. Each component is then encoded separately for transmission. One system in particular used a harmonic+noise model in which a sum-of-sinusoids model is fit to the speech signal to perform the decomposition.

In speech coding, the decomposition is done to find a parameterization of the speech signal that accurately represents the input noisy speech signal. The decomposition has no noise-reduction capability and as such has not been useful in speech recognition.

SUMMARY OF THE INVENTION

A system and method are provided that reduce noise in speech signals. The system and method decompose a noisy speech signal into a harmonic component and a residual component. The harmonic component and residual component are then combined as a sum to form a noise-reduced value. In some embodiments, the sum is a weighted sum where the harmonic component is multiplied by a scaling factor. In some embodiments, the noise-reduced value is used in speech recognition.

DETAILED DESCRIPTION OF ILLUSTRATIVE EMBODIMENTS

Figure 1:
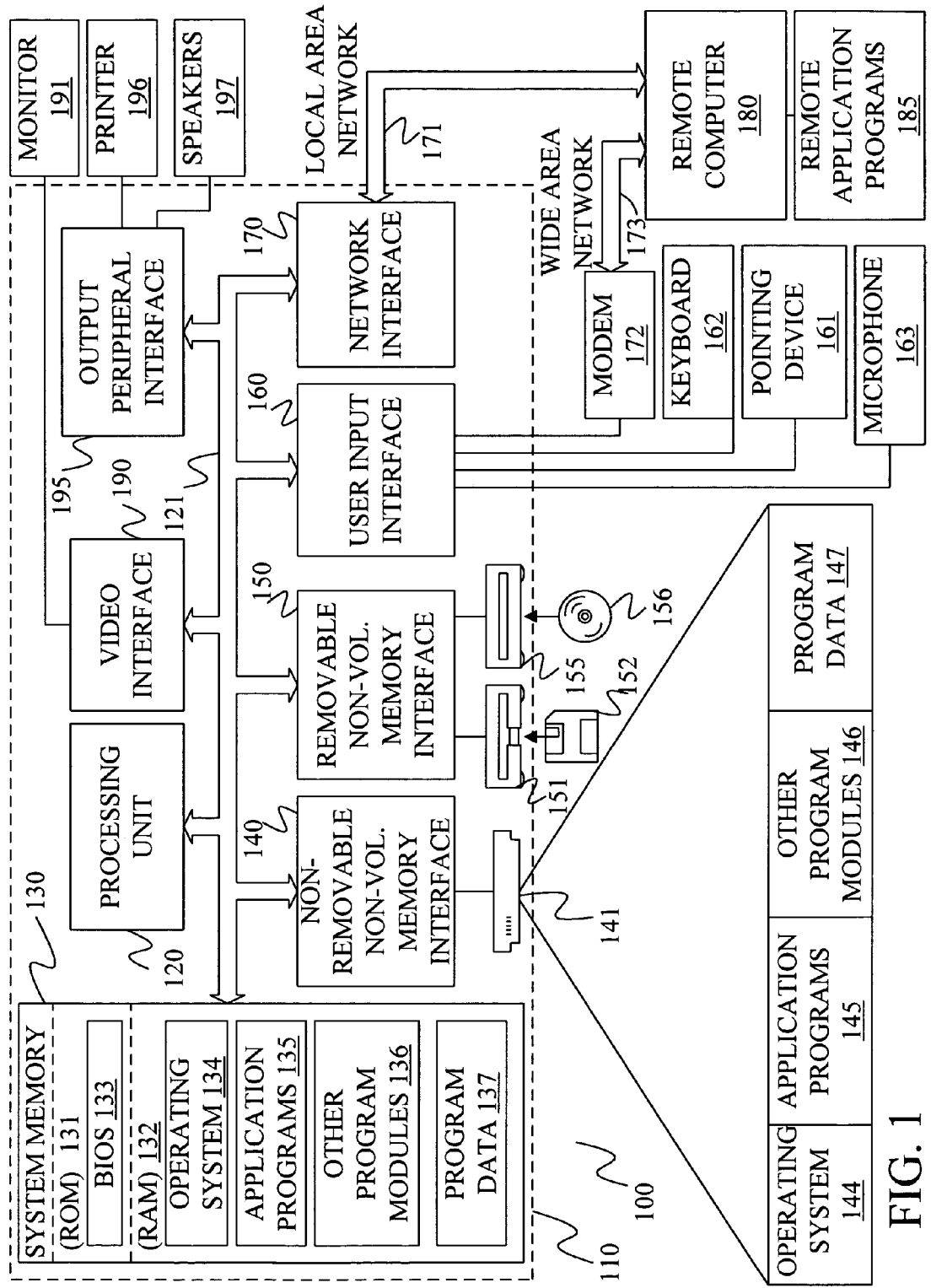
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
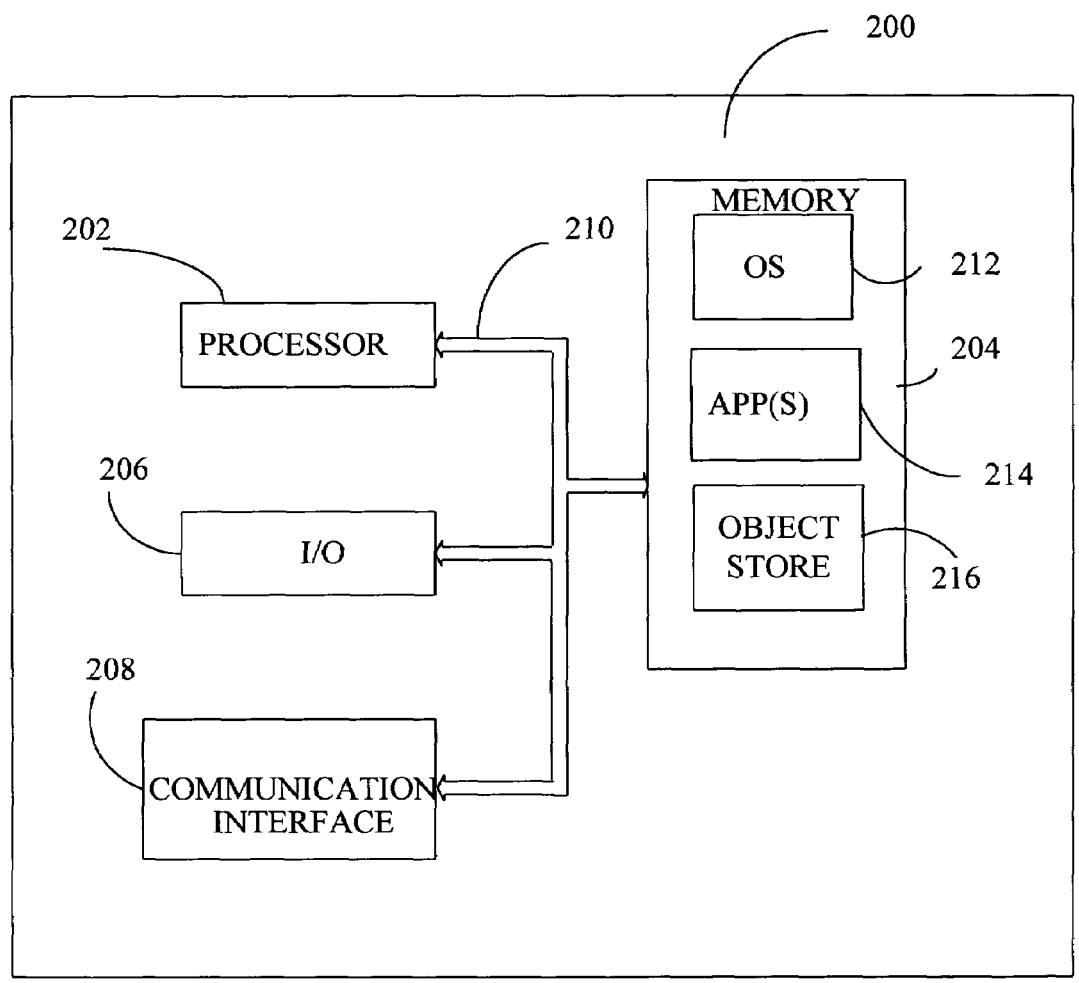
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Under one aspect of the present invention, a system and method are provided that reduce noise in a speech signal by decomposing the speech signal into a harmonic component and a random component and then taking a weighted sum of the harmonic component and the random component to form a noise-reduced feature vector representing a noise-reduced speech signal. The noise-reduced feature vector can then be used as input to a speech decoder.

Figure 3:
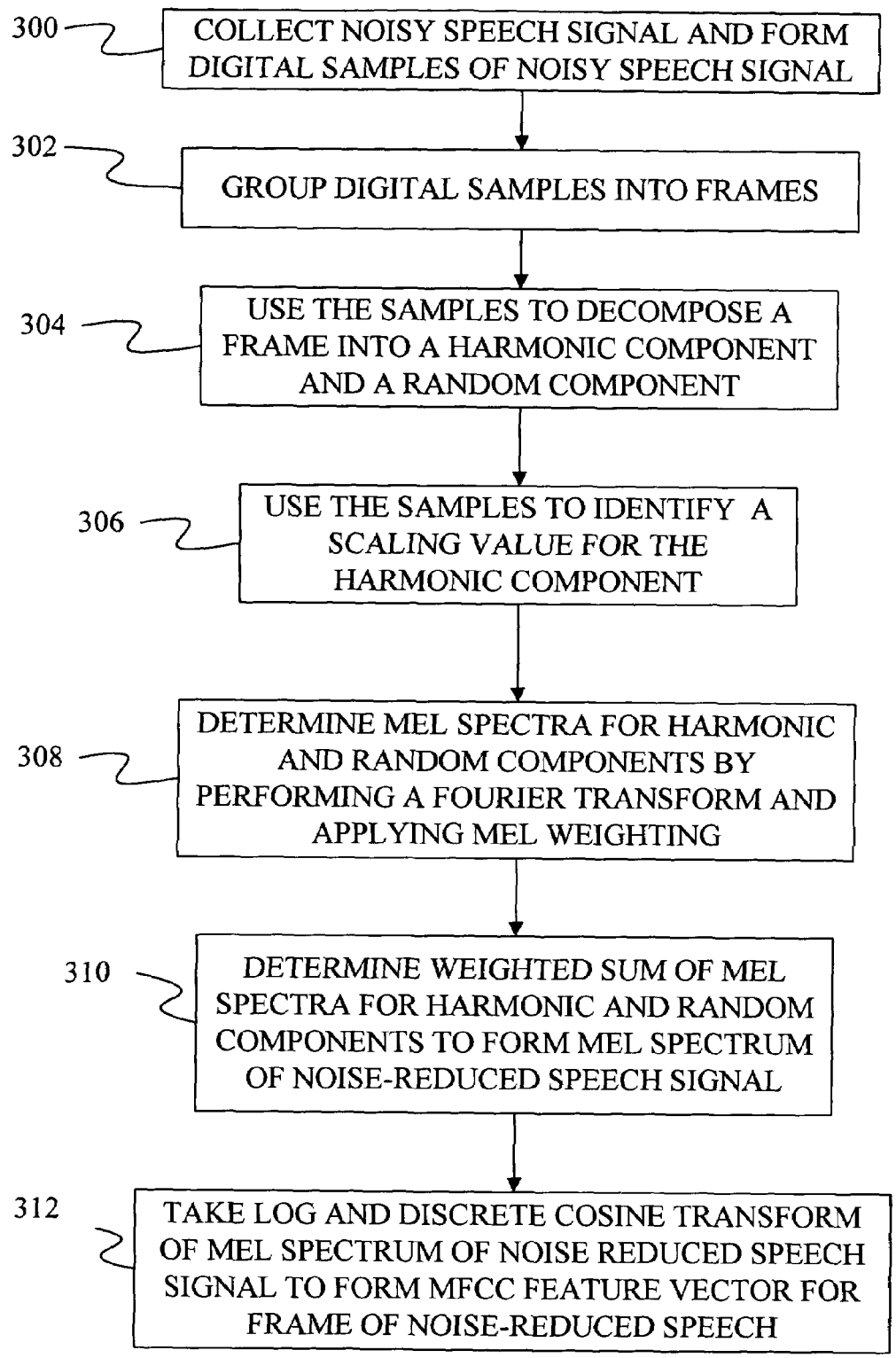
FIG. 3 is a flow diagram of a method of using a noise reduction system of one embodiment of the present invention.
Figure 4:
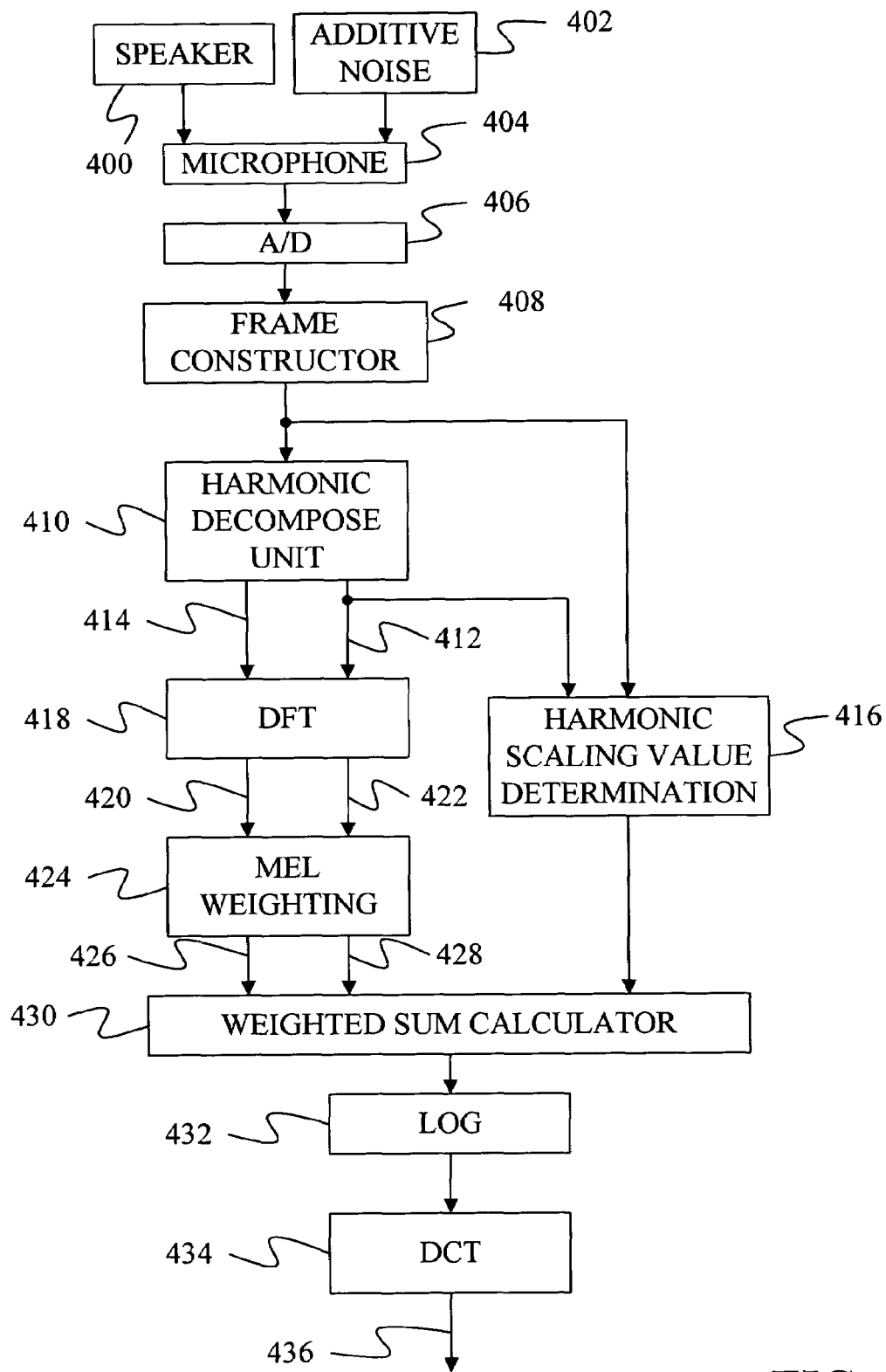
FIG. 4 is a block diagram of a noise reduction system of one embodiment of the present invention.

A method and apparatus for forming noise-reduced feature vectors are shown in the flow diagram of FIG. 3 and the block diagram of FIG. 4, respectively.

At step 300, a noisy speech signal is collected and converted into digital samples. To do this, a microphone 404 of FIG. 4, converts audio waves from a speaker 400 and one or more additive noise sources 402 into electrical signals. The electrical signals are then sampled by an analog-to-digital converter 406 to generate a sequence of digital values. In one embodiment, A-to-D converter 406 samples the analog signal at 16 kHz and 16 bits per sample, thereby creating 32 kilobytes of speech data per second. At step 302, the digital samples are grouped into frames by a frame constructor 408.

Under one embodiment, frame constructor 408 creates a new frame every 10 milliseconds that includes 25 milliseconds worth of data.

The samples of each frame are provided to a harmonic decompose unit 410, which uses the samples at step 304 to decompose the signal associated with the frame into a harmonic component and a random component. Thus, the noisy signal is represented as:

$$y = y_h + y_r \qquad \text{EQ. 1}$$

where y is the noisy signal, $y_h$ is the harmonic component, and $y_r$ is the random component.

Under one embodiment, the harmonic component is modeled as a sum of harmonically-related sinusoids such that:

$$y_h = \sum_{k=1}^{K} a_k \cos(k\omega_0 t) + b_k \sin(k\omega_0 t) \qquad \text{EQ. 2}$$

where $\omega_0$ is the fundamental or pitch frequency and K is the total number of harmonics in the signal.

Thus, to identify the harmonic component, an estimate of the pitch frequency and the amplitude parameters $\{a_1 a_2 \ldots a_k b_1 b_2 \ldots b_k\}$ must be determined.

An estimate for the pitch frequency can be determined using any number of available pitch tracking systems. Under many of these systems, candidate pitches are used to identify possible spacing between the centers of segments of the speech signal. For each candidate pitch, a correlation is determined between successive segments of speech. In general, the candidate pitch that provides the best correlation will be the pitch frequency of the frame. In some systems, additional information is used to refine the pitch selection such as the energy of the signal and/or an expected pitch track.

Given an estimate of the pitch, a least-squares solution for the amplitude parameters can be determined. To do so, equation 2 is rewritten as:

$$y = Ab \qquad \text{EQ. 3}$$

where y is a vector of N samples of the noisy speech signal, A is an N×2K matrix given by:

$$A = [A_{cos} A_{sin}] \qquad \text{EQ. 4}$$

with elements $$A_{cos}(k,t) = \cos(k\omega_0 t) \quad A_{sin}(k,t) = \sin(k\omega_0 t) \qquad \text{EQ. 5}$$

and b is a 2K×1 vector given by:

$$b^T = [a_1 a_2 \ldots a_k b_1 b_2 \ldots b_k] \qquad \text{EQ. 6}$$

Then, the least-squares solution for the amplitude coefficients is:

$$\hat{b} = (A^T A)^{-1} A^T y \qquad \text{EQ. 7}$$

Using $\hat{b}$, an estimate for the harmonic component of the noisy speech signal can be determined as:

$$y_h = A\hat{b} \qquad \text{EQ. 8}$$

An estimate of the random component is then calculated as:

$$y_r = y - y_h \qquad \text{EQ. 9}$$

Thus, using equations 7-9 above, harmonic decompose unit 410 is able to produce a vector of harmonic component samples 412, $y_h$, and a vector of random component samples 414, $y_r$.

After the samples of the frame have been decomposed into harmonic and random samples, a scaling parameter or weight is determined for the harmonic component at step 306. This scaling parameter is used as part of a calculation of a noise-reduced speech signal as discussed further below. Under one embodiment, the scaling parameter is calculated as:

$$\alpha_h = \frac{\sum_i y_h(i)^2}{\sum_i y(i)^2} \quad \text{EQ. 10}$$

where $\alpha_h$ is the scaling parameter, $y_h(i)$ is the ith sample in the vector of harmonic component samples $y_h$ and $y(i)$ is the ith sample of the noisy speech signal for this frame. In Equation 10, the numerator is the sum of the energy of each sample of the harmonic component and the denominator is the sum of the energy of each sample of the noisy speech signal. Thus, the scaling parameter is the ratio of the harmonic energy of the frame to the total energy of the frame.

In alternative embodiments, the scaling parameter is set using a probabilistic voiced-unvoiced detection unit. Such units provide the probability that a particular frame of speech is voiced, meaning that the vocal cords resonate during the frame, rather than unvoiced. The probability that the frame is from a voiced region of speech can be used directly as the scaling parameter.

After the scaling parameter has been determined or while it is being determined, the Mel spectra for the vector of harmonic component samples and the vector of random component samples are determined at step 308. This involves passing each vector of samples through a Discrete Fourier Transform (DFT) 418 to produce a vector of harmonic component frequency values 422 and a vector of random component frequency values 420. The power spectra represented by the vectors of frequency values are then smoothed by a Mel weighting unit 424 using a series of triangular weighting functions applied along the Mel scale. This results in a harmonic component Mel spectral vector 428, $Y_h$, and a random component Mel spectral vector 426, $Y_r$.

At step 310, the Mel spectra for the harmonic component and the random component are combined as a weighted sum to form an estimate of a noise-reduced Mel spectrum. This step is performed by weighted sum calculator 430 using the scaling factor determined above in the following equation:

$$\hat{X}(t) = \alpha_h(t) Y_h(t) + \alpha_r Y_r(t) \quad \text{EQ. 11}$$

where $\hat{X}(t)$ is the estimate of the noise-reduced Mel spectrum, $Y_h(t)$ is the harmonic component Mel spectrum, $Y_r(t)$ is the random component Mel spectrum, $\alpha_h(t)$ is the scaling factor determined above, $\alpha_r$ is a fixed scaling factor for the random component that in one embodiment is set equal to 0.1, and the time index t is used to emphasize that the scaling factor for the harmonic component is determined for each frame while the scaling factor for the random component remains fixed. Note that in other embodiments, the scaling factor for the random component may be determined for each frame.

After the noise-reduced Mel spectrum has been calculated at step 310, the log 432 of the Mel spectrum is determined and then is applied to a Discrete Cosine Transform 434 at step 312. This produces a Mel Frequency Cepstral Coefficient (MFCC) feature vector 436 that represents a noise-reduced speech signal.

A separate noise-reduced MFCC feature vector is produced for each frame of the noisy signal. These feature vectors may be used for any desired purpose including speech coding and speech recognition.

Figure 5:
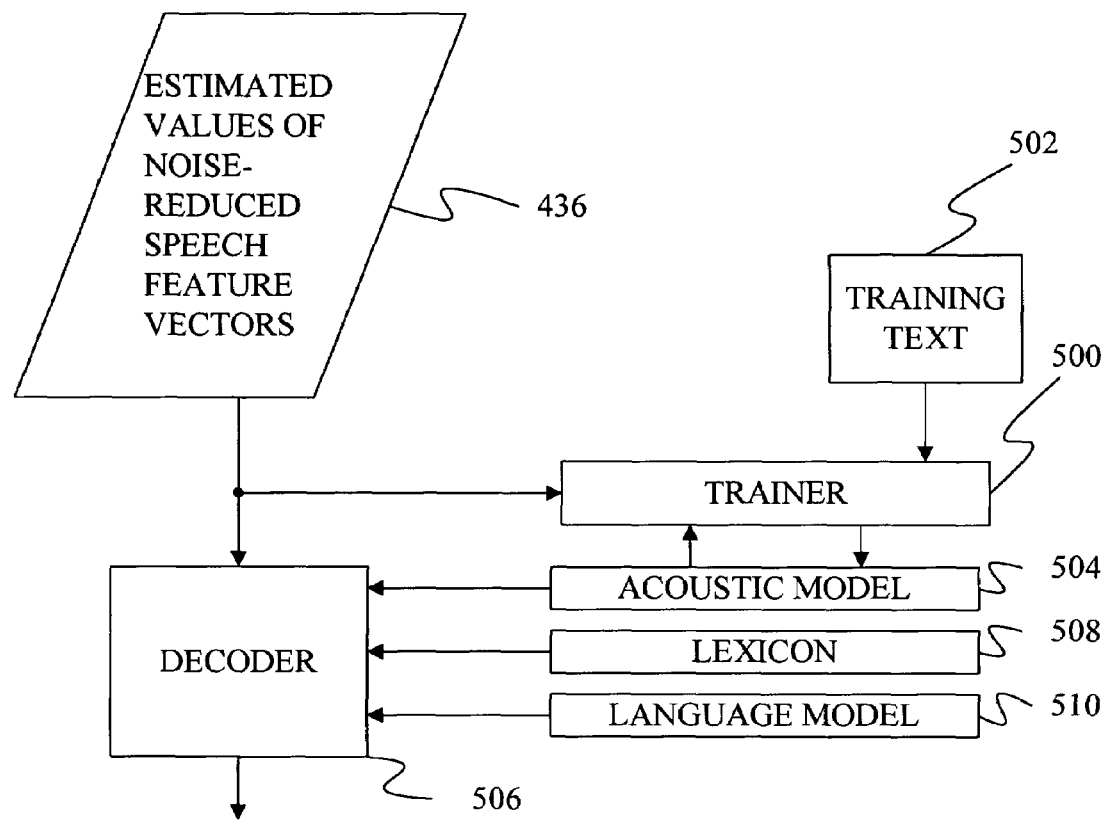
FIG. 5 is a block diagram of pattern recognition system with which embodiments of the present invention may be practiced.

Under one embodiment, the MFCC feature vectors for the noise-reduced speech are used directly in a speech recognition system as shown in FIG. 5.

If the input signal is a training signal, the series of MFCC feature vectors 436 for the noise-reduced speech is provided to a trainer 500, which uses the MFCC feature vectors and a training text 502 to train an acoustic model 504. Techniques for training such models are known in the art and a description of them is not required for an understanding of the present invention.

If the input signal is a test signal, the MFCC speech feature vectors are provided to a decoder 506, which identifies a most likely sequence of words based on the stream of feature vectors, a lexicon 508, a language model 510, and the acoustic model 504. The particular method used for decoding is not important to the present invention and any of several known methods for decoding may be used.

Although the invention has been described above in connection with Mel Frequency Cepstral Coefficients, other types of features may be used in the weighted harmonic and noise model of Equation 11.

Although the present invention has been described with reference to particular embodiments, workers skilled in the art will recognize that changes may be made in form and detail without departing from the spirit and scope of the invention.

What is claimed is:

1. A method of identifying an estimate for a noise-reduced value representing a portion of a noise-reduced speech signal, the method comprising:

decomposing each frame of a noisy speech signal into a harmonic component for the frame and a random component for the frame;

for each frame, determining a separate scaling parameter for the frame for at least the harmonic component wherein determining a scaling parameter for each frame of the harmonic component comprises determining a ratio of an energy of the harmonic component in the frame without the random component of the frame to an energy of the frame of the noisy speech signal;

for each frame, multiplying the harmonic component of the frame by the scaling parameter of the frame for the harmonic component to form a scaled harmonic component for the frame;

for each frame, multiplying the random component of the frame by a fixed scaling parameter for the random component, wherein the fixed scaling parameter is the same for all frames and is less than one to form a scaled random component for the frame; and for each frame, summing the scaled harmonic component for the frame and the scaled random component for the frame to form the noise-reduced value representing a frame of a noise-reduced speech signal wherein the frame of the noise-reduced speech signal has reduced noise relative to the frame of the noisy speech signal.

2. The method of claim 1 wherein decomposing the portion of the noisy speech signal comprises modeling the harmonic component as a sum of harmonic sinusoids.

3. The method of claim 2 wherein decomposing the portion of the noisy speech signal further comprises determining a least-squares solution to identify the harmonic component.

4. The method of claim 1 wherein determining a ratio comprises:

summing the energy of samples of the harmonic component;

summing the energy of samples of the noisy speech signal; and dividing the sum for the harmonic component by the sum for the noisy speech signal.

5. The method of claim 1 wherein decomposing the portion of the noisy speech signal comprises decomposing a vector of time samples from a frame of the noisy speech signal into a harmonic component vector of time samples and a random component vector of time samples.

6. The method of claim 5 further comprising determining a Mel spectrum for the harmonic component from the harmonic component vector of time samples.

7. The method of claim 6 wherein multiplying the harmonic component by the scaling parameter comprises multiplying the Mel spectrum for the harmonic component by the scaling parameter.

8. The method of claim 7 further comprising forming a Mel Frequency Cepstral Coefficients feature vector from the noise-reduced value.

9. The method of claim 8 further comprising using the Mel Frequency Cepstral Coefficients feature vector to perform speech recognition.

10. The method of claim 1 further comprising using the noise-reduced value to perform speech recognition.

11. The method of claim 1 further comprising using the noise-reduced value in speech coding.

12. A computer-readable storage medium having computer-executable instructions for performing steps comprising:

identifying a harmonic component and a random component in a noisy speech signal wherein identifying the harmonic component comprises modeling the harmonic component as a sum of harmonic sinusoids, each sinusoid having an amplitude parameter;

forming a weighted sum to produce a noise-reduced value representing a noise- reduced speech signal that has reduced noise compared to the noisy speech signal, wherein the weighted sum is formed by multiplying the harmonic component by a scaling value for the harmonic component to form a scaled harmonic component, multiplying the random component by a scaling value for the random component to form a scaled random component and adding the scaled harmonic component to the scaled random component to produce the noise reduced value, wherein the scaling value for the harmonic component is different than the scaling value for the random component, the scaling value for the harmonic component is separately determined for each frame of the noisy speech signal and the scaling value for the random component is fixed for all frames of the noisy speech signal so that the same scaling parameter for the random component is used on each frame of the noisy speech signal; and using the noise-reduced value to perform speech recognition.

13. The computer-readable medium of claim 12 wherein identifying a harmonic component further comprises identifying a least-squares solution.

14. The computer-readable medium of claim 12 wherein identifying a harmonic component comprises identifying a vector of time samples representing a harmonic component.

15. The computer-readable medium of claim 14 wherein identifying a harmonic component further comprises converting the vector of time samples into a Mel spectrum for the harmonic component.

16. The computer-readable storage medium of claim 12 further comprising determining the scaling value for the harmonic component by determining a ratio of an energy of the harmonic component to an energy of the noisy speech signal.

17. The computer-readable storage medium of claim 12 wherein using the noise-reduced value to perform speech recognition comprises converting the noise-reduced value into a feature vector and using the feature vector as input to a speech recognition system.

18. The computer-readable storage medium of claim 17 wherein the feature vector comprises a Mel Frequency Cepstral Coefficient feature vector.

\* \* \* \* \*